(12) United States Patent
Muto et al.

(10) Patent No.: US 8,928,174 B2
(45) Date of Patent: Jan. 6, 2015

(54) BATTERY CONTROL APPARATUS, BATTERY CONTROL METHOD, AND VEHICLE

(75) Inventors: Kazuhiro Muto, Chiba (JP); Masanobu Mera, Kanagawa (JP)

(73) Assignee: The Japan Research Institute, Limited, Tokyo (JP)

( * ) Notice: Subject to any disclaimer, the term of this patent is extended or adjusted under 35 U.S.C. 154(b) by 684 days.

(21) Appl. No.: 13/245,863

(22) Filed: Sep. 27, 2011

(65) Prior Publication Data
US 2012/0013180 A1 Jan. 19, 2012

Related U.S. Application Data

(63) Continuation of application No. PCT/JP2010/002265, filed on Mar. 29, 2010.

(30) Foreign Application Priority Data

Mar. 30, 2009 (JP) ................................. 2009-083605

(51) Int. Cl.
H02J 1/00 (2006.01)
(52) U.S. Cl.
USPC .......................................................... 307/71
(58) Field of Classification Search
USPC .......................................................... 307/71
See application file for complete search history.

(56) References Cited

U.S. PATENT DOCUMENTS

| 5,744,936 A * | 4/1998 | Kawakami ...................... 320/120 |
| 2002/0113493 A1 * | 8/2002 | Morrow ............................. 307/71 |
| 2007/0247106 A1 | 10/2007 | Kawahara et al. |

FOREIGN PATENT DOCUMENTS

| EP | 1837944 A2 | 9/2007 |
| JP | H11-046450 A | 2/1999 |
| JP | H11-046451 A | 2/1999 |
| JP | 2000-102103 A | 4/2000 |
| JP | 2001-45606 A | 2/2001 |
| JP | 2001-119812 A | 4/2001 |
| JP | 2002-101565 A | 4/2002 |
| JP | 2007-236115 A | 9/2007 |
| JP | 2007-259612 A | 10/2007 |
| JP | 2008-117573 A | 5/2008 |
| JP | 2008-219964 A | 9/2008 |

OTHER PUBLICATIONS

International Search Report for International application No. PCT/JP2010/002265, mailed on Jun. 29, 2010.
English translation of Written Opinion (IB338) for International application No. PCT/JP2010/002265, mailed on Nov. 24, 2011.
Office Action for Japanese Patent Application No. 2009-083605, issued by the Japanese Patent Office on Aug. 20, 2013.

* cited by examiner

*Primary Examiner* — Robert L. Deberadinis

(57) ABSTRACT

A battery control apparatus comprising a battery circuit in which a plurality of batteries are connected to each other; a plurality of first switches that switch whether the batteries are connected in series or connected in parallel; a voltage detecting section that detects a maximum voltage output by the battery circuit; and a switch control section that, when the maximum voltage of the battery circuit occurring when the batteries are connected in parallel is less than or equal to a first threshold value, controls the first switches to connect at least a portion of the batteries in series.

9 Claims, 9 Drawing Sheets

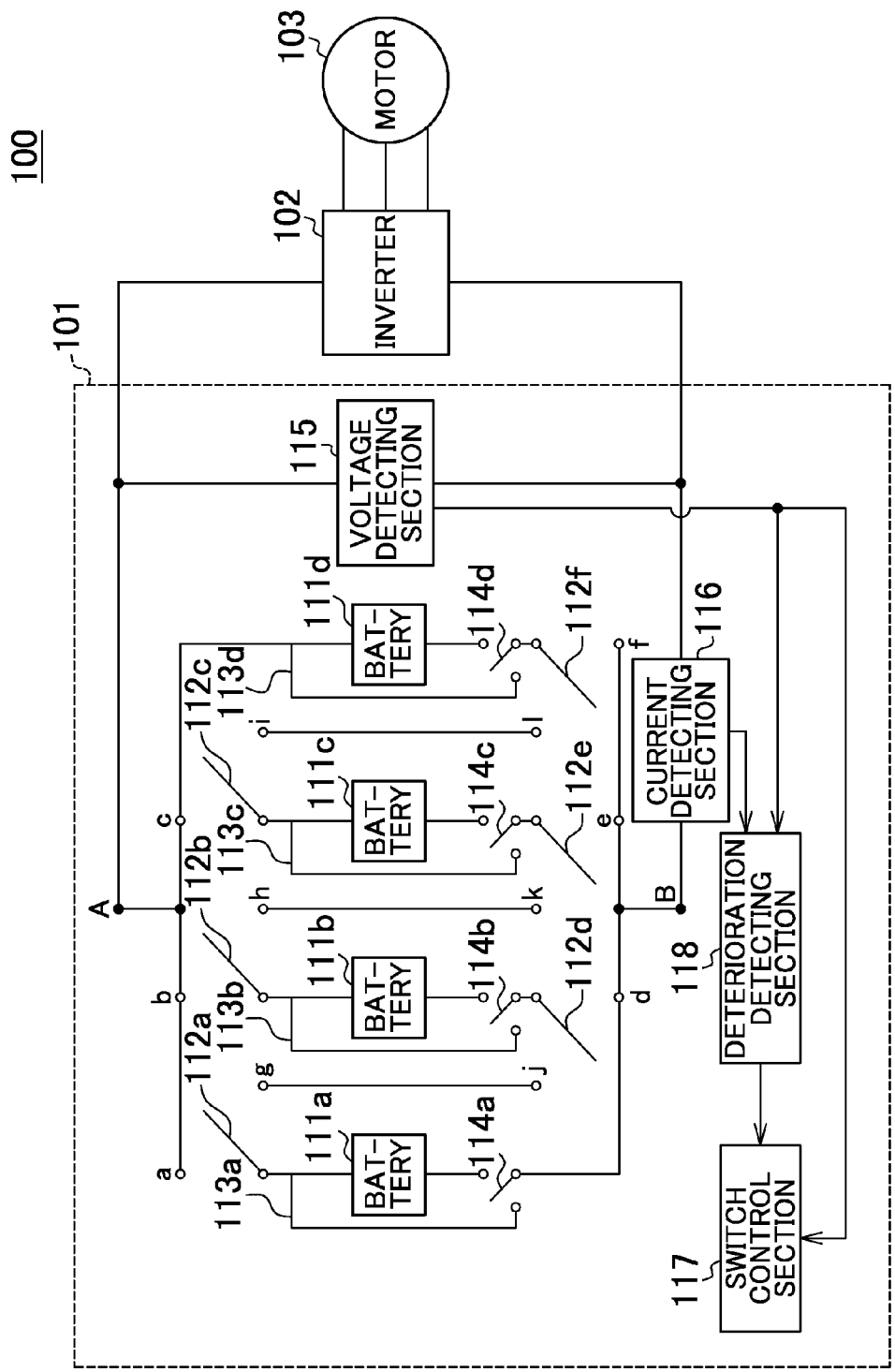
F I G. 1

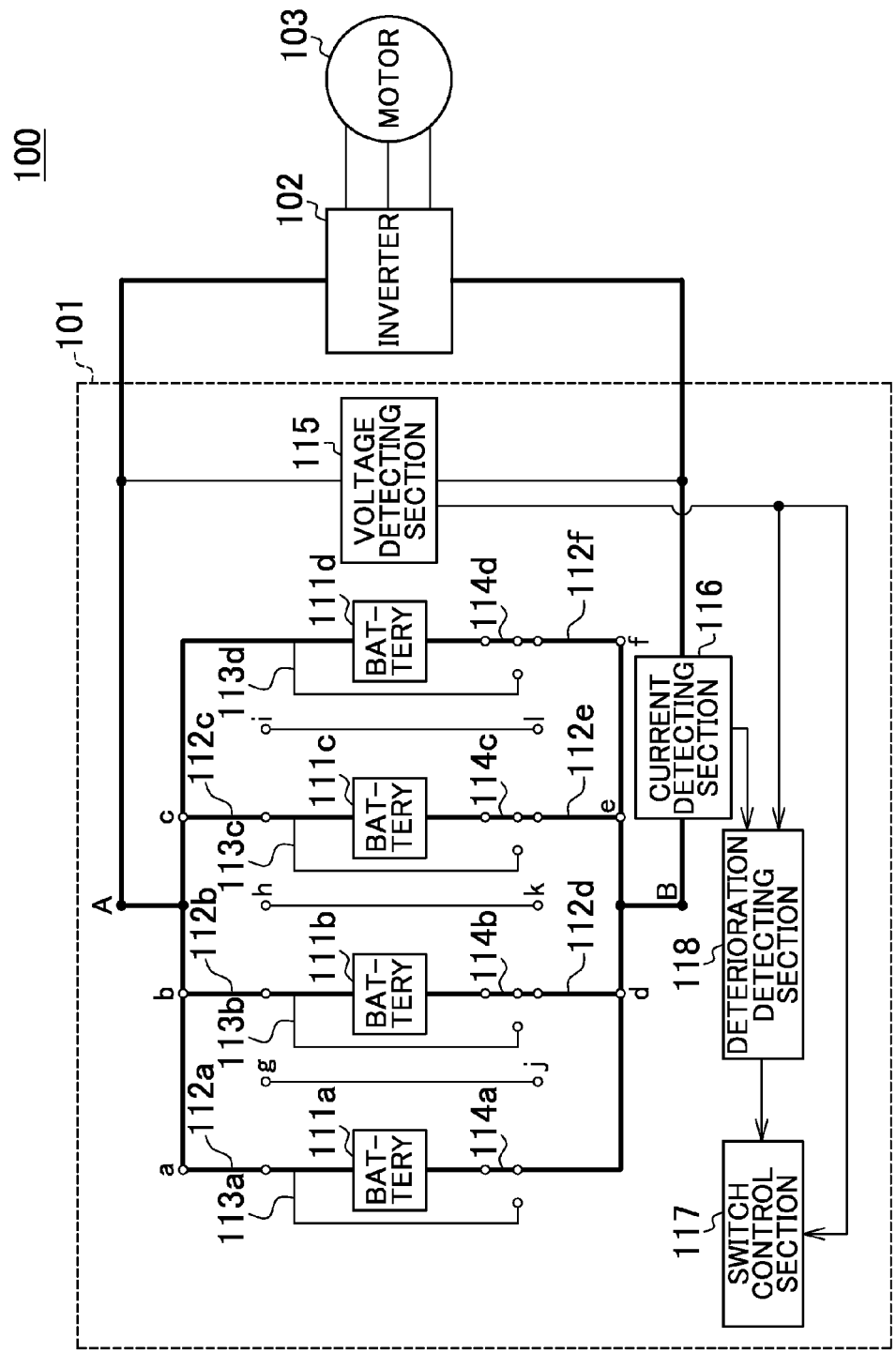
F I G. 2

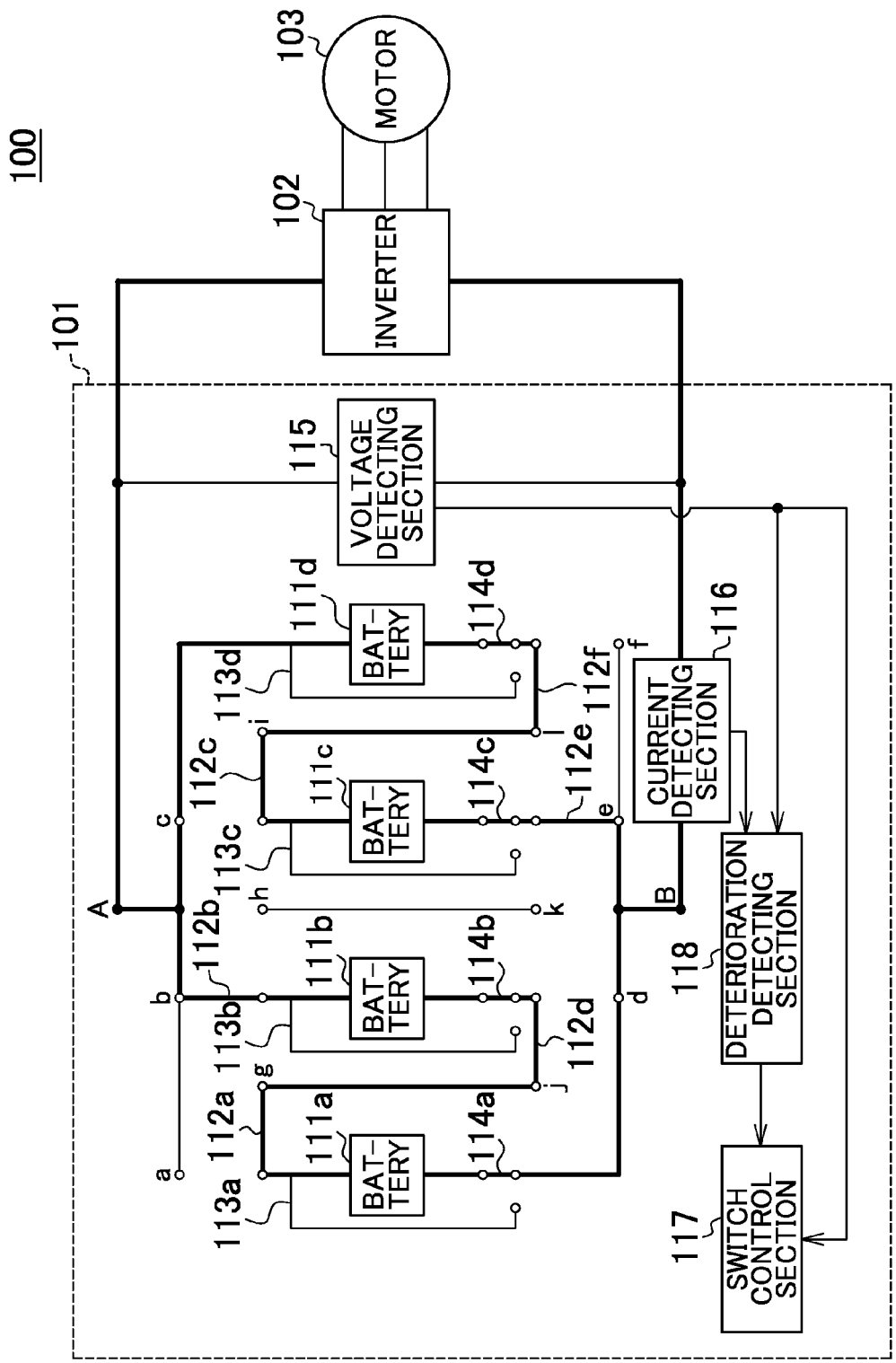
F I G . 3

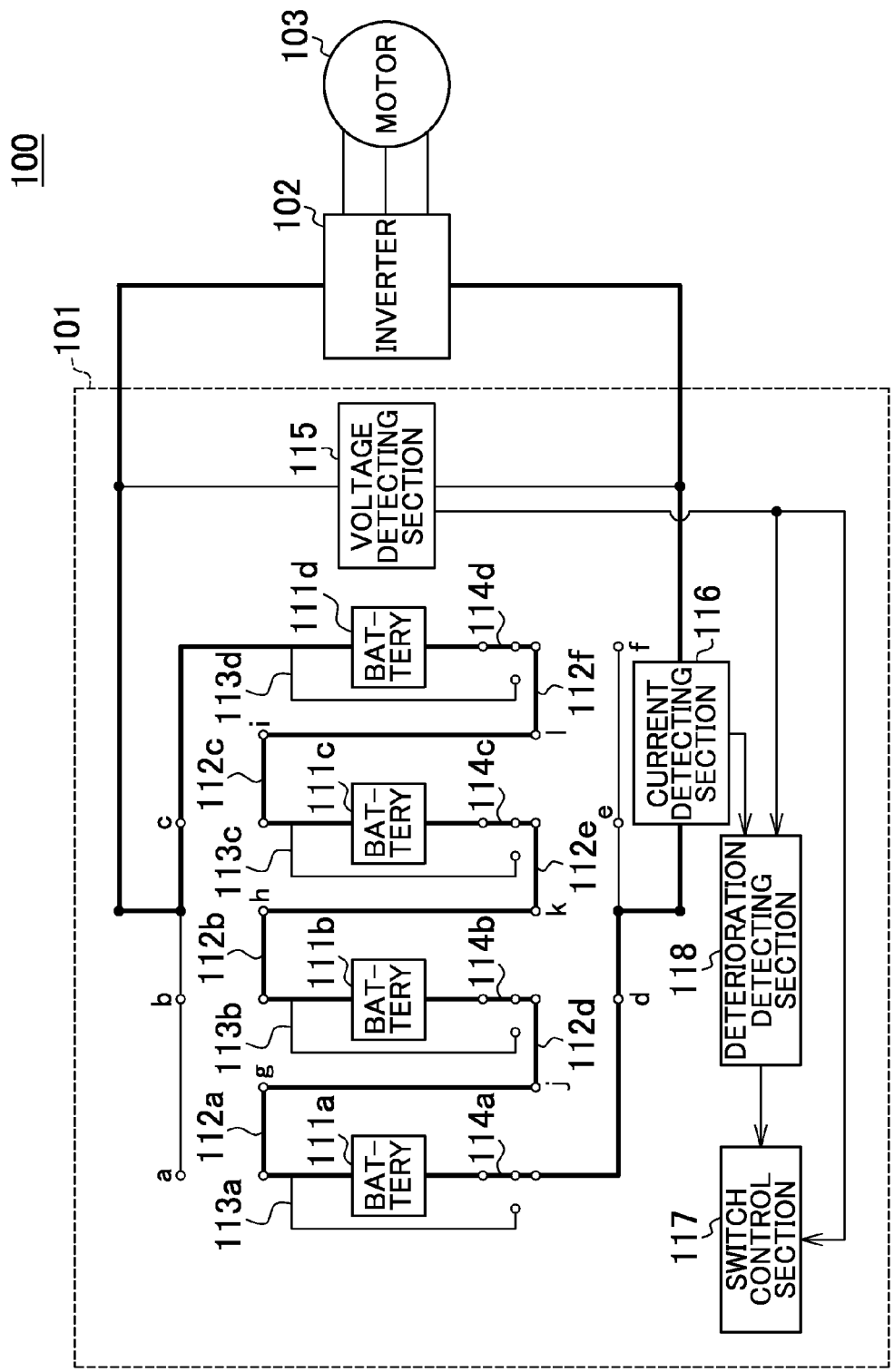
F I G. 4

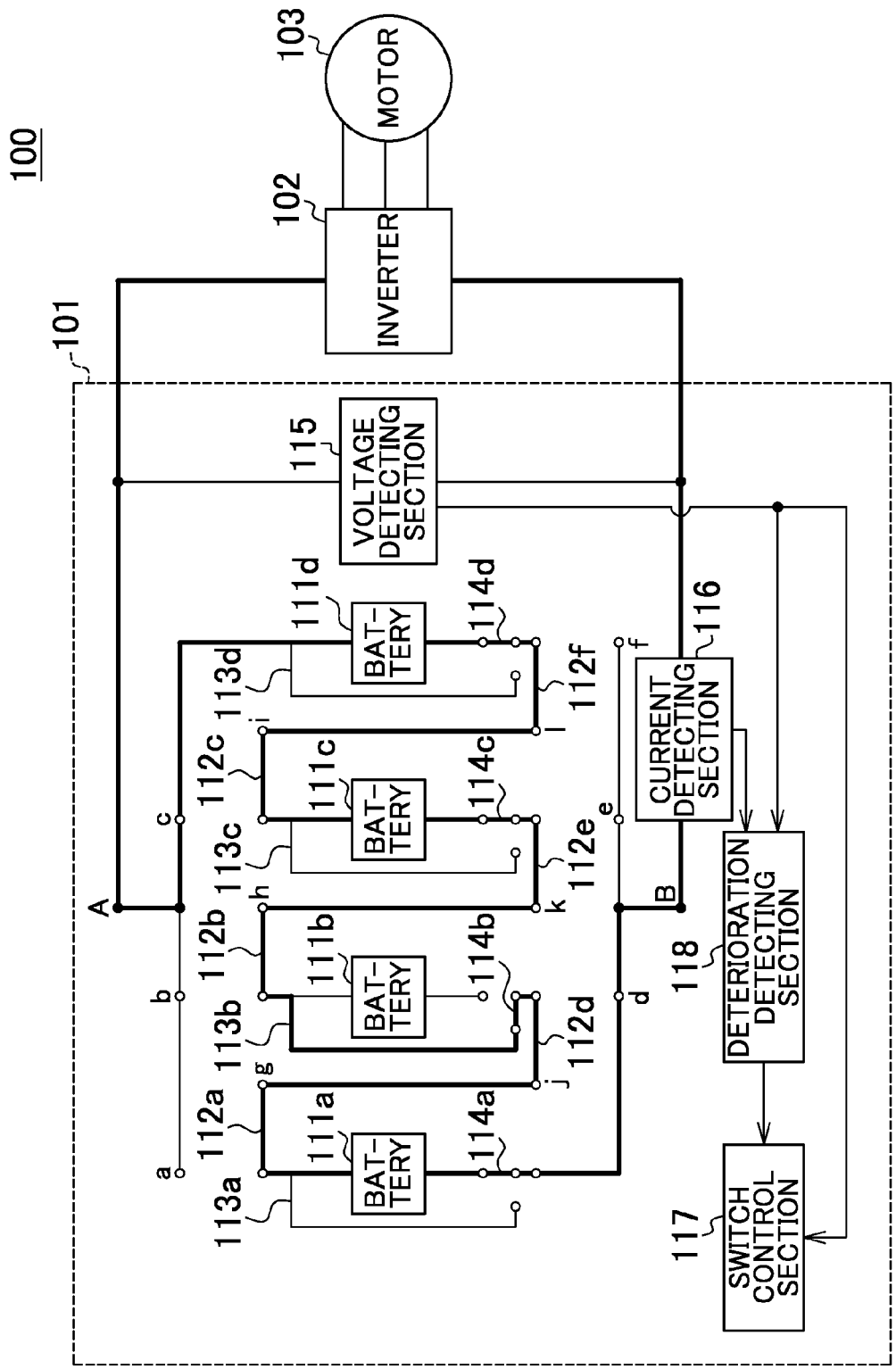
F I G. 5

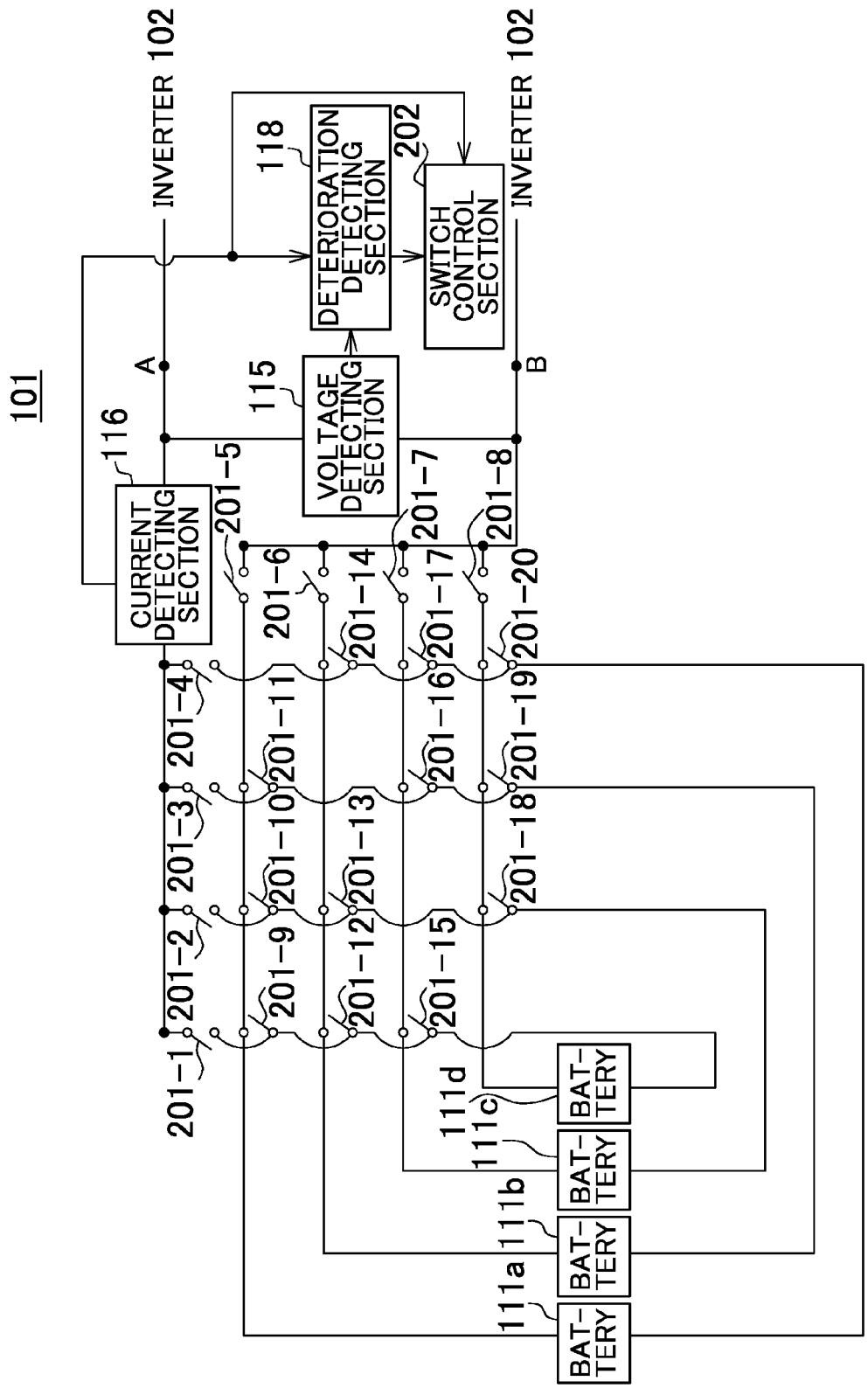
F I G . 6

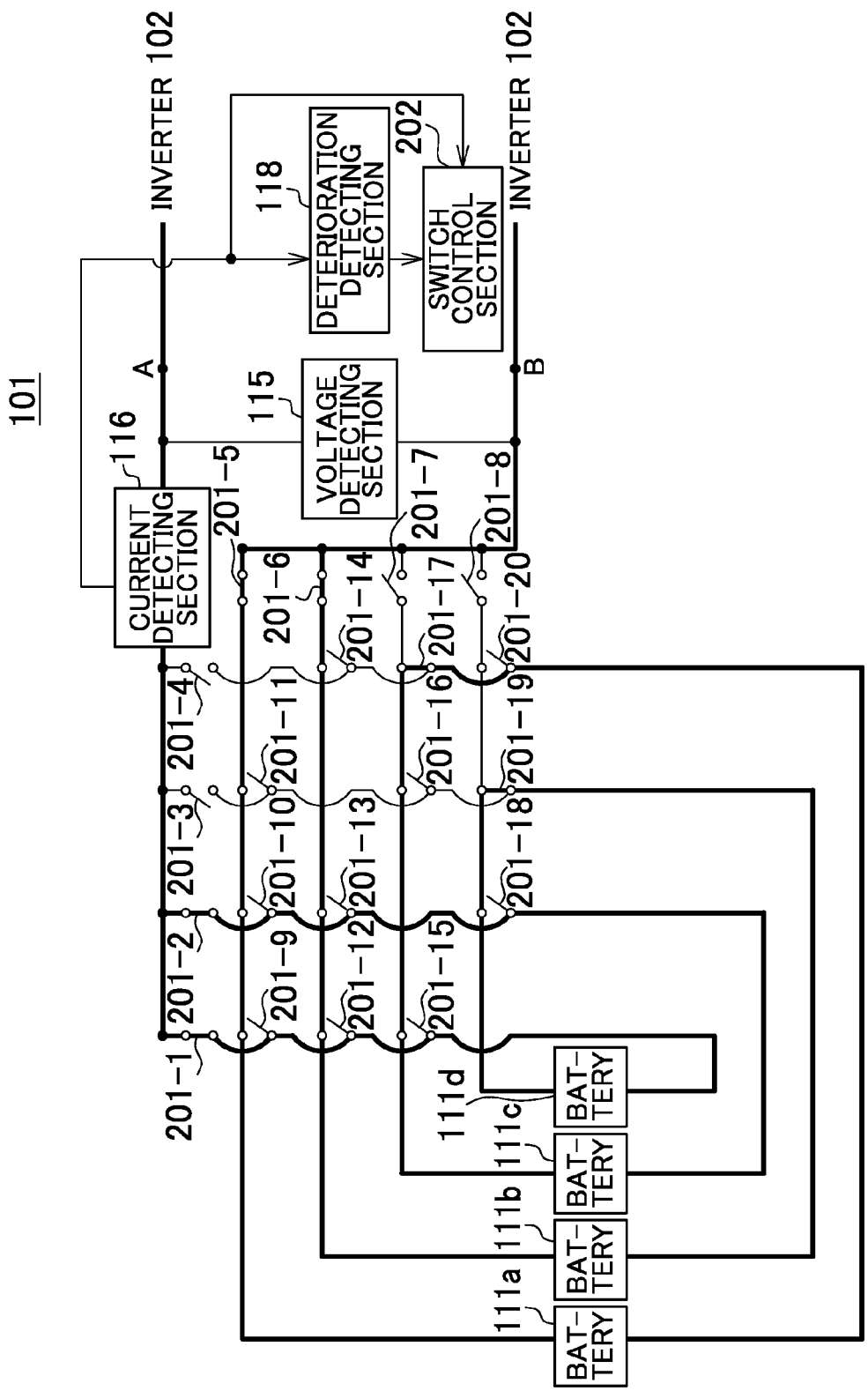
F I G. 8

BATTERY CONTROL APPARATUS, BATTERY CONTROL METHOD, AND VEHICLE

The contents of the following International patent application are incorporated herein by reference: International Patent Application No. PCT/JP2010/002265 filed on Mar. 29, 2010.

BACKGROUND

1. Technical Field

The present invention relates to a battery control apparatus, a battery control method, and a vehicle for switching a connection state of a plurality of batteries.

2. Related Art

A conventional technique is know for running an electric automobile even when the battery thereof dies by using a backup battery. For example, see Japanese Patent Application Publication No. 2000-102103, Japanese Patent Application Publication No. 2001-45606, and Japanese Patent Application Publication No. 2001-119812.

The battery must be replaced with the backup battery when the voltage of the battery runs out, and performing this replacement can be a nuisance.

SUMMARY

According to a first aspect related to the innovations herein, provided is a battery control apparatus comprising a battery circuit in which a plurality of batteries are connected to each other; a plurality of first switches that switch whether the batteries are connected in series or connected in parallel; a voltage detecting section that detects a maximum voltage output by the battery circuit; and a switch control section that, when the maximum voltage of the battery circuit occurring when the batteries are connected in parallel is less than or equal to a first threshold value, controls the first switches to connect at least a portion of the batteries in series.

When the maximum voltage of the battery circuit drops below the first threshold value, the switch control section may control the first switches to connect a portion of the batteries in series and to connect each resulting battery set, which is formed by a plurality of batteries connected in series, in parallel.

The battery control apparatus may further comprise a deterioration detecting section that detects deterioration of each battery, and the switch control section may control the first switches to connect batteries having similar deterioration in series and to connect each resulting battery set, which is formed by a plurality of batteries connected in series, in parallel.

When the maximum voltage of the battery circuit drops below a second threshold value that is less than the first threshold value, the switch control section may control the first switches to connect the batteries in series.

The battery control apparatus may further comprise a plurality of bypass circuits that each exclude a corresponding battery from the battery circuit; a plurality of second switches that are each connected to a corresponding bypass circuit and switch whether the corresponding battery is excluded from the battery circuit; and a deterioration detecting section that detects deterioration of each battery. The switch control section may control the second switches to exclude from the battery circuit batteries having greater degrees of deterioration.

The battery control apparatus may further comprise a deterioration detecting section that detects deterioration of each battery. At least a portion of the first switches may function to exclude batteries from the battery circuit, and the switch control section may control the first switches to exclude from the battery circuit batteries having greater degrees of deterioration.

The summary clause does not necessarily describe all necessary features of the embodiments of the present invention. The present invention may also be a sub-combination of the features described above.

BRIEF DESCRIPTION OF THE DRAWINGS

FIG. 1 shows an exemplary vehicle 100.

FIG. 2 shows an exemplary state of the battery circuit when the batteries 111 are connected in parallel.

FIG. 3 shows an exemplary state of the battery circuit when the maximum voltage of the battery circuit drops below the first threshold value.

FIG. 4 shows an exemplary state of the battery circuit when the maximum voltage of the battery circuit drops below the second threshold value.

FIG. 5 shows another exemplary state of the battery circuit when the maximum voltage of the battery circuit drops below the second threshold value.

FIG. 6 shows an exemplary battery control apparatus 101.

FIG. 8 shows another exemplary state of the battery circuit when the maximum voltage of the battery circuit drops below the first threshold value.

DESCRIPTION OF EXEMPLARY EMBODIMENTS

Figure 7:
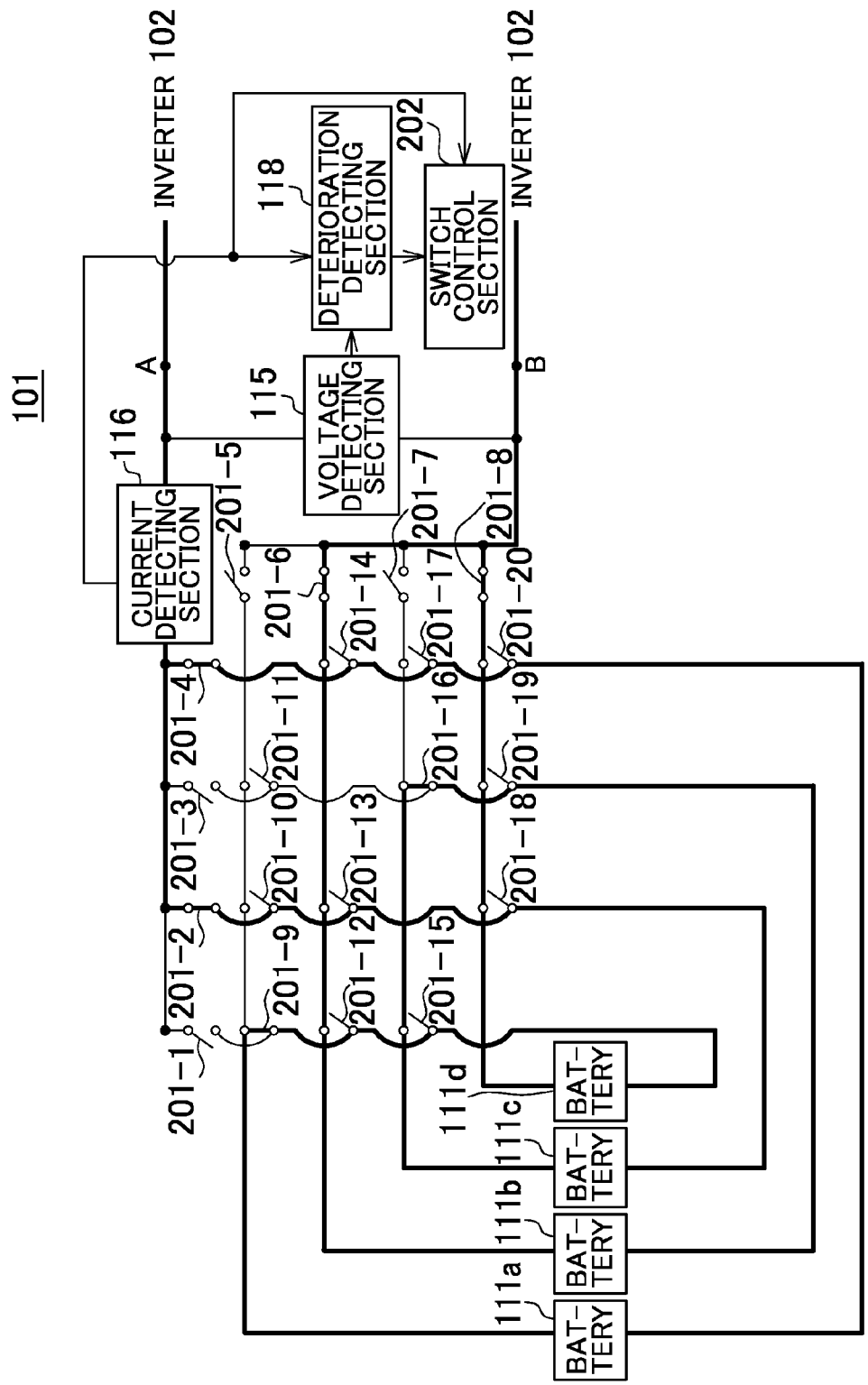
FIG. 7 shows an exemplary state of the battery circuit when the maximum voltage of the battery circuit drops below the first threshold value.

Hereinafter, some embodiments of the present invention will be described. The embodiments do not limit the invention according to the claims, and all the combinations of the features described in the embodiments are not necessarily essential to means provided by aspects of the invention.

FIG. 1 shows an exemplary vehicle 100. The vehicle 100 includes a battery control apparatus 101, an inverter 102, and a motor 103. The battery control apparatus 101 includes a plurality of batteries 111, a plurality of first switches 112, a plurality of bypass circuits 113, a plurality of second switches 114, a voltage detecting section 115, a current detecting section 116, a switch control section 117, and a deterioration detecting section 118. The vehicle 100 may be an electric automobile.

A battery circuit is formed by connecting the batteries 111 to each other. The battery circuit may be a circuit containing a plurality of connected batteries 111 that can supply power to a load, and may be referred to as a "battery pack." The batteries 111 are connected either in series or in parallel. In the battery circuit, the plurality of batteries 111 can be connected in series and connected in parallel. The first switches 112 switch whether the batteries 111 are connected in series or connected in parallel. The bypass circuits 113 exclude batteries 111 from the battery circuit. The second switches 114 are connected to the bypass circuits 113 and switch which of the batteries 111 are excluded from the battery circuit.

The voltage detecting section 115 detects the maximum voltage output by the battery circuit. The maximum voltage of the battery circuit is the voltage difference between point A and point B. The voltage detecting section 115 outputs the detected voltage to the switch control section 117 and the deterioration detecting section 118. The current detecting section 116 detects the maximum current output by the battery circuit. The current detecting section 116 outputs the detected current to the switch control section 117 and the deterioration detecting section 118.

The deterioration detecting section 118 detects deterioration of each battery 111. The deterioration detecting section 118 detects the deterioration of each battery 111 based on at least one of the voltage and the current of the battery 111. The deterioration detecting section 118 may detect, as the deterioration of a battery 111, at least one of an internal resistance value of the battery 111, the number of times that the battery 111 is charged and discharged, the voltage of the battery 111 when charging is begun, the voltage of the battery 111 when charging is finished, a charge curve of the battery 111, and a deterioration curve of the battery 111. In the present embodiment, the deterioration detecting section 118 detects the internal resistance value of each battery 111. The deterioration of each battery 111 detected by the deterioration detecting section 118 is output to the switch control section 117. The deterioration detecting section 118 outputs a deterioration value that indicates the degree of the detected deterioration to the switch control section 117. A larger deterioration value indicates greater progression of the deterioration. When the deterioration detecting section 118 detects the internal resistance value as the deterioration, the internal resistance value may be used as-is as the deterioration value.

The switch control section 117 controls the first switches 112. The switch control section 117 controls the first switches 112 based on the maximum voltage of the battery circuit detected by the voltage detecting section 115. When the maximum voltage of the battery circuit occurring when the batteries 111 are connected in parallel is greater than a first threshold value, the switch control section 117 may control the first switches 112 to connect the batteries 111 in parallel. If the maximum voltage of the battery circuit when the batteries 111 connected in parallel is less than or equal to the first threshold value, the switch control section 117 controls the first switches 112 to connect at least a portion of the batteries 111 in series.

When the maximum voltage of the battery circuit drops below the first threshold value, the switch control section 117 controls the first switches 112 to connect at least a portion of the batteries 111 in series and to connect, in parallel, battery sets that are each formed by serially connected batteries 111. When the maximum voltage of the battery circuit occurring when the batteries 111 are connected in parallel drops below the first threshold value, the switch control section 117 controls the first switches 112 to connect at least a portion of the batteries 111 in series and to connect, in parallel, battery sets that are each formed by serially connected batteries 111. When the maximum voltage of the battery circuit drops below a second threshold voltage that is lower than the first threshold voltage, the switch control section 117 may control the first switches 112 to connect the batteries 111 in series. When the maximum voltage of the battery circuit occurring when the batteries 111 are connected in parallel drops below the second threshold voltage that is lower than the first threshold voltage, the switch control section 117 may control the first switches 112 to connect the batteries 111 in series. Here, each "set" of batteries is a group of batteries 111 connected in series. The first and second threshold values may be higher than the voltage value at which the batteries 111 over-discharge.

The switch control section 117 controls the second switches 114. The switch control section 117 controls the second switches 114 to exclude batteries 111 from the battery circuit and connect batteries 111 to the battery circuit. The switch control section 117 controls the second switches 114 to exclude batteries 111 that are more deteriorated from the battery circuit. Accordingly, the battery circuit can be formed of batteries 111 with less deterioration. As a result, the deterioration rate of the overall battery circuit can be decreased and the efficiency of the overall battery circuit can be improved. Furthermore, the rate of deterioration of each battery 111 can be decreased, thereby enabling efficient use of each battery 111.

The switch control section 117 may exclude from the battery circuit each of the batteries 111 whose deterioration amount differs from the deterioration amount of the least deteriorated battery 111 by a prescribed value or more. For example, when the internal resistance value is used as the deterioration value, the internal resistance value of the battery 111 having the lowest internal resistance value among the batteries 111 is used as a reference. The switch control section 117 then excludes from the battery circuit each battery 111 whose internal resistance value differs from the reference internal resistance value by a prescribed value or more. As another example, the switch control section 117 may simply exclude each battery 111 whose internal resistance value is greater than or equal to a prescribed value.

The switch control section 117 controls the first switches 112 and the second switches 114 to sequentially connect the batteries 111 in the battery circuit and exclude from the battery circuit all batteries 111 other than the currently connected battery 111. More specifically, the switch control section 117 may connect a battery 111a in the battery circuit and exclude all of the other batteries 111. Next, the battery 111a is excluded from the battery circuit and the battery 111b is connected in the battery circuit. In this case, all of the batteries 111 other than the battery 111b are excluded from the battery circuit. In this way, the switch control section 117 can connect each battery 111 in the battery circuit while all batteries 111 other than the currently connected battery 111 are excluded from the battery circuit.

When the battery 111a is connected and the other batteries 111 are excluded, for example, the first switch 112a may be connected to a parallel terminal "a," the first switch 112d may be connected to a serial terminal "j," the first switch 112e may be connected to a serial terminal "k," and the first switch 112f may be connected to a serial terminal "l." In this case, the second switch 114a is connected to the battery 111a side and not the bypass circuit 113a side. Furthermore, when the battery 111b is connected and the other batteries 111 are excluded, for example, the first switch 112b may be connected to a parallel terminal "b," the first switch 112d may be connected to a parallel terminal "d," the first switch 112a may be connected to a serial terminal "g," the first switch 112e may be connected to the serial terminal "k," and the first switch 112f may be connected to a serial terminal "l." In this case, the second switch 114b is connected to the battery 111b side and not the bypass circuit 113b side. In this way, the first switches 112 and second switches 114 are switched such that the voltage detecting section 115 and the current detecting section 116 sequentially detect the voltage and current of each battery 111. A voltage detecting section 115 may be provided for each battery 111, in which case each voltage detecting section 115 detects the voltage of the corresponding battery 111. A current detecting section 116 may be provided for each battery 111, in which case each current detecting section 116 detects the current of the corresponding battery 111.

The switch control section 117 may periodically connect the batteries 111 in parallel. The switch control section 117 may connect the batteries 111 in parallel when driving of the motor 103 is stopped or when driving of the motor is 103 is begun. The switch control section 117 may connect the batteries 111 in parallel when the vehicle 100 is finished being used or when the vehicle 100 begins to be used. After this, the switch control section 117 may control the first switches 112 based on the maximum voltage of the battery circuit.

The following describes the deterioration detection performed by the deterioration detecting section 118. The internal resistance value of each battery 111 can be calculated based on the current and voltage of the battery 111. The deterioration detecting section 118 may detect the internal resistance value of each battery 111 based on the detected voltage and current of the battery 111. The deterioration detecting section 118 may periodically detect the internal resistance value of each battery 111 and record the results as an internal resistance value history. The number of times a battery 111 is charged and discharged is measured such that a cycle of charging and discharging is counted as 1 time. In other words, the period from when the battery 111 is charged to the next charging of the battery 111 may be counted as 1 time. The charge/discharge count can be counted according to the voltage history or the current history of the battery 111. The deterioration detecting section 118 may detect the number of times a battery 111 is charged and discharged based on the voltage history of the battery 111. The deterioration detecting section 118 may detect the number of times a battery 111 is charged and discharged based on the current of the battery 111. The deterioration of a battery 111 progresses as the number of times the battery 111 is charged and discharged increases. The deterioration value may be determined according to the number of times a battery 111 is charged and discharged.

The voltage history of a battery 111 indicates the change of the voltage of the battery 111 over time. In other words, the deterioration detecting section 118 can acquire the voltage history by recording the voltage of the battery 111 for each of a plurality of prescribed periods. The current history of a battery 111 indicates the change of the current of the battery 111 over time. In other words, the deterioration detecting section 118 can acquire the current history by recording the current of the battery 111 for each of a plurality of prescribed periods.

The voltage of the battery 111 when charging is begun can be referred to hereinafter as "charge-start voltage." The deterioration detecting section 118 may record a history of the charge-start voltage of each battery 111 and detect the lowest charge-start voltage among the batteries 111. The deterioration progresses as the charge-start voltage of a battery 111 decreases below the over-discharge voltage. The charge-start voltage may refer to the voltage reached when a battery 111 is discharged. The deterioration value may be determined according to the charge-start voltage. The deterioration detecting section 118 may detect the number of times that the charge-start voltage is detected to be lower than a prescribed voltage. The deterioration progresses as the number of times the charge-start voltage is detected to be below the prescribed voltage increases. This prescribed voltage may be the over-discharge voltage. The deterioration information may be determined according to the number of times the charge-start voltage is determined to be below the prescribed voltage.

The voltage of the battery 111 when charging is finished can be referred to hereinafter as "charge-end voltage." The deterioration detecting section 118 may record a value indicating the voltage of each battery 111 when fully charged, and directly detect the voltage. The deterioration progresses as the fully-charged voltage of a battery 111 decreases. The deterioration detecting section 118 may detect the number of times that each battery 111 is charged despite already being fully charged. In other words, the deterioration detecting section 118 may detect the number of times each battery 111 is over-charged. The deterioration progresses as number of times the battery 111 is over-charged increases.

The charge curve indicates a relationship between voltage and charge period during charging of a battery 111. The deterioration detecting section 118 may detect the charge curve based on the voltage detected from when charging begins to when charging ends. When the voltage increase relative to the charge period is high, the deterioration of the battery 111 is low. When the voltage increase relative to the charge period is low, the deterioration of the battery 111 is high. The deterioration value may be determined according to the state of the charge curve.

The deterioration curve indicates the deterioration history of a battery 111. The deterioration curve may indicate the change of the voltage of the battery 111 when fully charged. The deterioration curve may indicate a relationship between the number of times the battery 111 is charged and the voltage of the battery 111 when fully charged. As the number of times the battery 111 is charged increases, the voltage of the battery 111 when fully charged decreases. In other words, as the deterioration progresses, the voltage of the battery 111 when fully charged decreases. The deterioration detecting section 118 may detect the deterioration curve by recording the number of times the battery 111 is charged and the voltage of the battery 111 when fully charged. The deterioration curve may indicate change in the internal resistance value of the battery 111. As the internal resistance value of the battery 111 increases, deterioration of the battery 111 progresses. The deterioration curve may indicate a relationship between the internal resistance of the battery 111 and the number of times the battery 111 is charged. As the number of times the battery 111 is charged increases, the internal resistance of the battery 111 also increases. The deterioration value may be determined according to the state of the deterioration curve. Since the deterioration of the battery 111 can progress more quickly due to temperature, the deterioration detecting section 118 may detect the deterioration of the battery 111 while considering the temperature of the battery 111. In this case, the vehicle 100 includes a temperature sensor that detects the temperature of each battery 111.

FIG. 2 shows an exemplary state of the battery circuit when the maximum voltage of the battery circuit occurring when the batteries 111 are connected in parallel is greater than or equal to the first threshold value. Here, all of the batteries 111 have the same degree of deterioration. When the maximum voltage of the battery circuit is greater than or equal to the first threshold value, the switch control section 117 connects the first switch 112a to the parallel terminal "a," connects the first switch 112b to the parallel terminal "b," and connects the first switch 112c to the parallel terminal "c." Furthermore, the switch control section 117 connects the first switch 112d to the parallel terminal "d," connects the first switch 112e to the parallel terminal "e," and connects the first switch 112f to the parallel terminal "f." As a result, all of the batteries 111 are connected in parallel. Furthermore, since all of the batteries 111 have the same degree of deterioration, the switch control section 117 connects all of the second switches 114 to the battery 111 side. The thick lines in FIG. 2 represent the flow of current supplied to the inverter 102.

When there is a battery 111 that has a greater degree of deterioration than the other batteries 111, the switch control section 117 controls the second switches 114 to exclude the battery 111 with the greater degree of deterioration from the battery circuit. For example, when the battery 111c has a deterioration amount greater than that of the other batteries 111, the switch control section 117 connects the corresponding second switch 114 to the bypass circuit 113c. As a result, the battery 111c is excluded from the battery circuit.

FIG. 3 shows an exemplary state of the battery circuit when the maximum voltage of the battery circuit drops below the first threshold value. Here, all of the batteries 111 have the same degree of deterioration. When the maximum voltage of the battery circuit drops below the first threshold value, the switch control section 117 controls the first switches 112 to connect a portion of the batteries 111 in series and connect the resulting battery sets, which each contain batteries connected in series, in parallel. Each battery set connected in parallel preferably includes therein the same number of batteries 111 connected in series. More specifically, the switch control section 117 connects the first switch 112a to the serial terminal "g," connects the first switch 112b to the parallel terminal "b," and connects the first switch 112c to the serial terminal "i." Furthermore, the switch control section 117 connects the first switch 112d to the serial terminal "j," connects the first switch 112e to the parallel terminal "e," and connects the first switch 112f to the serial terminal "l." In this case, a battery set is formed in which the battery 111a and the battery 111b are connected in series. Another battery set is formed in which the battery 111c and the battery 111d are connected in series. These battery sets containing serially connected batteries 111 are connected in parallel. As a result, the maximum voltage output by the battery circuit can be increased. Furthermore, since all of the batteries 111 have the same degree of deterioration, the switch control section 117 connects all of the second switches 114 to the battery 111 side. The thick lines in FIG. 3 represent the flow of the current supplied to the inverter 102.

When there is a battery 111 that has a greater degree of deterioration than the other batteries 111, the switch control section 117 controls the second switches 114 to exclude the battery 111 with the greater degree of deterioration from the battery circuit. For example, when the battery 111c has a greater degree of deterioration than that of the other batteries 111, the switch control section 117 connects the corresponding second switch 114 to the bypass circuit 113c. As a result, the battery 111c is excluded from the battery circuit.

FIG. 4 shows an exemplary state of the battery circuit when the maximum voltage of the battery circuit drops below the second threshold value. Here, all of the batteries 111 have the same degree of deterioration. When the maximum voltage of the battery circuit drops below the second threshold value, the switch control section 117 connects the batteries 111 in series. When the maximum voltage of the battery circuit drops below the second threshold value, the switch control section 117 connects the first switch 112a to the serial terminal "g," connects the first switch 112b to the serial terminal "h," and connects the first switch 112c to the serial terminal "i." Furthermore, the switch control section 117 connects the first switch 112d to the serial terminal "j," connects the first switch 112e to the serial terminal "k," and connects the first switch 112f to the serial terminal "l." As a result, all of the batteries 111 are connected in series and the voltage output by the battery circuit can be increased. Furthermore, since the batteries 111 all have the same degree of deterioration, the switch control section 117 connects all of the second switches 114 to the battery 111 side. The thick lines in FIG. 4 represent the flow of the current supplied to the inverter 102.

FIG. 5 shows another exemplary state of battery circuit when the maximum voltage of the battery circuit drops below the second threshold value. Here, the battery 111b has a larger degree of deterioration than the other batteries 111. In this case, since the second switch 114b is connected to the bypass circuit side, the battery 111b is excluded from the battery circuit. The thick lines in FIG. 5 represent the flow of the current supplied to the inverter 102.

FIG. 6 shows an exemplary battery control apparatus 101. The battery control apparatus 101 includes a plurality of batteries 111, a plurality of first switches 201, a voltage detecting section 115, a current detecting section 116, a switch control section 202, and a deterioration detecting section 118. Components that are the same as those shown in FIG. 1 are given the same reference numerals.

A battery circuit is formed by connecting the batteries 111 to each other. The battery circuit may be a circuit containing a plurality of connected batteries 111 that can supply power to a load, and may be referred to as a "battery pack." The batteries 111 are connected either in series or in parallel. The first switches 201 switch whether the batteries 111 are connected in series or connected in parallel. The first switches 201 also function to exclude batteries 111 from the battery circuit. In other words, the first switches 201 switch whether each battery 111 is connected in series, connected in parallel, or excluded from the battery circuit.

The voltage detecting section 115 detects the maximum voltage output by the battery circuit. The maximum voltage of the battery circuit is the voltage difference between point A and point B. The voltage detecting section 115 outputs the detected voltage to the switch control section 202 and the deterioration detecting section 118. The current detecting section 116 detects the maximum current output by the battery circuit. The current detecting section 116 outputs the detected current to the switch control section 202 and the deterioration detecting section 118. The deterioration detecting section 118 detects the deterioration of each battery 111. The deterioration detecting section 118 outputs the deterioration detected for each battery 111 to the switch control section 202.

The switch control section 202 controls the first switches 201. The switch control section 202 controls the first switches 201 based on the maximum voltage of the battery circuit detected by the voltage detecting section 115. When the maximum voltage of the battery circuit occurring when the batteries 111 are connected in parallel is greater than a first threshold value, the switch control section 202 may control the first switches 201 to connect the batteries 111 in parallel. For example, the switch control section 202 may turn ON the first switches 201-1, 201-2, 201-3, 201-4, 201-5, 201-6, 201-7, and 201-8, and turn OFF all of the other first switches 201.

When the maximum voltage of the battery circuit drops below the first threshold value, the switch control section 202 controls the first switches 201 to connect a portion of the batteries 111 in series and connect each battery set, which is formed by batteries 111 connected in series, in parallel. When the maximum voltage of the battery circuit occurring when the batteries 111 are connected in parallel drops below the first threshold value, the switch control section 202 may control the first switches 201 to connect a portion of the batteries 111 in series and connect each battery set, which is formed by batteries 111 connected in series, in parallel. In this case, the switch control section 202 may serially connect batteries 111 that have similar degrees of deterioration. In other words, each battery set may include batteries 111 with similar degrees of deterioration. Batteries 111 with similar degrees of deterioration are batteries 111 whose deterioration values are within a prescribed range. Each battery set preferably includes the same number of batteries 111.

When the maximum voltage of the battery circuit drops below a second threshold voltage that is lower than the first threshold voltage, the switch control section 202 may control the first switches 201 to connect the batteries 111 in series. When the maximum voltage of the battery circuit occurring when the batteries 111 are connected in parallel drops below the second threshold voltage that is lower than the first threshold voltage, the switch control section 202 may control the first switches 201 to connect the batteries 111 in series. For example, the switch control section 202 may turn ON the first switches 201-1, 201-5, 201-14, 201-16, and 201-18, and turn OFF the other first switches 201.

The switch control section 202 may control the first switches 201 to exclude batteries 111 from the battery circuit and connect batteries 111 to the battery circuit. The switch control section 202 controls the first switches 201 to exclude batteries 111 that are more deteriorated from the battery circuit. The switch control section 202 may exclude from the battery circuit each of the batteries 111 whose degree of deterioration differs from the degree of deterioration of the least deteriorated battery 111 by a prescribed value or more. As another example, the switch control section 202 may simply exclude each battery 111 whose internal resistance value is greater than or equal to a prescribed value.

The switch control section 202 controls the first switches 201 to sequentially connect the batteries 111 in the battery circuit and exclude from the battery circuit all batteries 111 other than the currently connected battery 111. More specifically, the switch control section 202 may connect a battery 111a in the battery circuit and exclude all of the other batteries 111. Next, the battery 111a is excluded from the battery circuit and the battery 111b is connected in the battery circuit. In this case, all of the batteries 111 other than the battery 111b are excluded from the battery circuit. In this way, the switch control section 202 can connect each battery 111 in the battery circuit while all batteries 111 other than the currently connected battery 111 are excluded from the battery circuit.

When the battery 111a is connected in the battery circuit and the other batteries 111 are excluded, for example, the first switch 201-4 and the first switch 201-5 are turned ON, and the other first switches 201 are turned OFF. When the battery 111b is connected in the battery circuit and the other batteries 111 are excluded, the first switch 201-3 and the first switch 201-6 are turned ON, and the other first switches 201 are turned OFF. In this way, the first switches 201 are switched such that the voltage detecting section 115 and the current detecting section 116 sequentially detect the voltage and current of each battery 111. A voltage detecting section 115 may be provided for each battery 111, in which case each voltage detecting section 115 detects the voltage of the corresponding battery 111. A current detecting section 116 may be provided for each battery 111, in which case each current detecting section 116 detects the current of the corresponding battery 111.

The switch control section 202 may periodically connect the batteries 111 in parallel. The switch control section 202 may connect the batteries 111 in parallel when driving of the motor 103 is stopped or when driving of the motor is 103 is begun. The switch control section 202 may connect the batteries 111 in parallel when the vehicle 100 is finished being used or when the vehicle 100 begins to be used. After this, the switch control section 202 may control the first switches 201 based on the maximum voltage of the battery circuit.

FIG. 7 shows an exemplary state of the battery circuit when the maximum voltage of the battery circuit drops below the first threshold value. The degrees of deterioration of the battery 111a and the battery 111d are similar to each other, and the degrees of deterioration of the battery 111b and the battery 111c are similar to each other. The switch control section 202 turns ON the first switches 201-2, 201-4, 201-6, 201-8, 201-9, and 201-16, and turns OFF the other first switches 201. In this case, a battery set is formed in which the battery 111a and the battery 111d are connected in series. Another battery set is formed in which the battery 111b and the battery 111c are connected in series. These battery sets containing serially connected batteries 111 are connected in parallel. As a result, the maximum voltage output by the battery circuit can be increased. The thick lines in FIG. 7 represent the flow of the current supplied to the inverter 102. Furthermore, since batteries 111 having similar degrees of deterioration are connected serially, deterioration rates of the batteries 111 are decreased.

When serially connecting and discharging a battery 111 that has a greater degree of deterioration and a battery 111 that has a lesser degree of deterioration, the battery 111 with the lesser degree of deterioration cannot be sufficiently discharged if the discharging is performed using the battery 111 with the greater degree of deterioration as a reference. Inversely, the battery 111 with the greater degree of deterioration is over-discharged if the discharging is performed using the battery 111 with the lesser degree of deterioration as a reference. Accordingly, when serially connecting a battery 111 that has a greater degree of deterioration and a battery 111 that has a lesser degree of deterioration, the deterioration rate of the batteries 111 increases and the usage efficiency of the batteries 111 decreases.

FIG. 8 shows an exemplary state of the battery circuit when the maximum voltage of the battery circuit drops below the first threshold value. The degrees of deterioration of the battery 111a and the battery 111c are similar to each other, and the degrees of deterioration of the battery 111b and the battery 111d are similar to each other. The switch control section 202 turns ON the first switches 201-1, 201-2, 201-5, 201-6, 201-17, and 201-19, and turns OFF the other first switches 201. In this case, a battery set is formed in which the battery 111a and the battery 111c are connected in series. Another battery set is formed in which the battery 111b and the battery 111d are connected in series. These battery sets containing serially connected batteries 111 are connected in parallel. As a result, the maximum voltage output by the battery circuit can be increased. Furthermore, since batteries 111 having similar degrees of deterioration are connected serially, deterioration rates of the batteries 111 are decreased. The thick lines in FIG. 8 represent the flow of the current supplied to the inverter 102.

Figure 9:
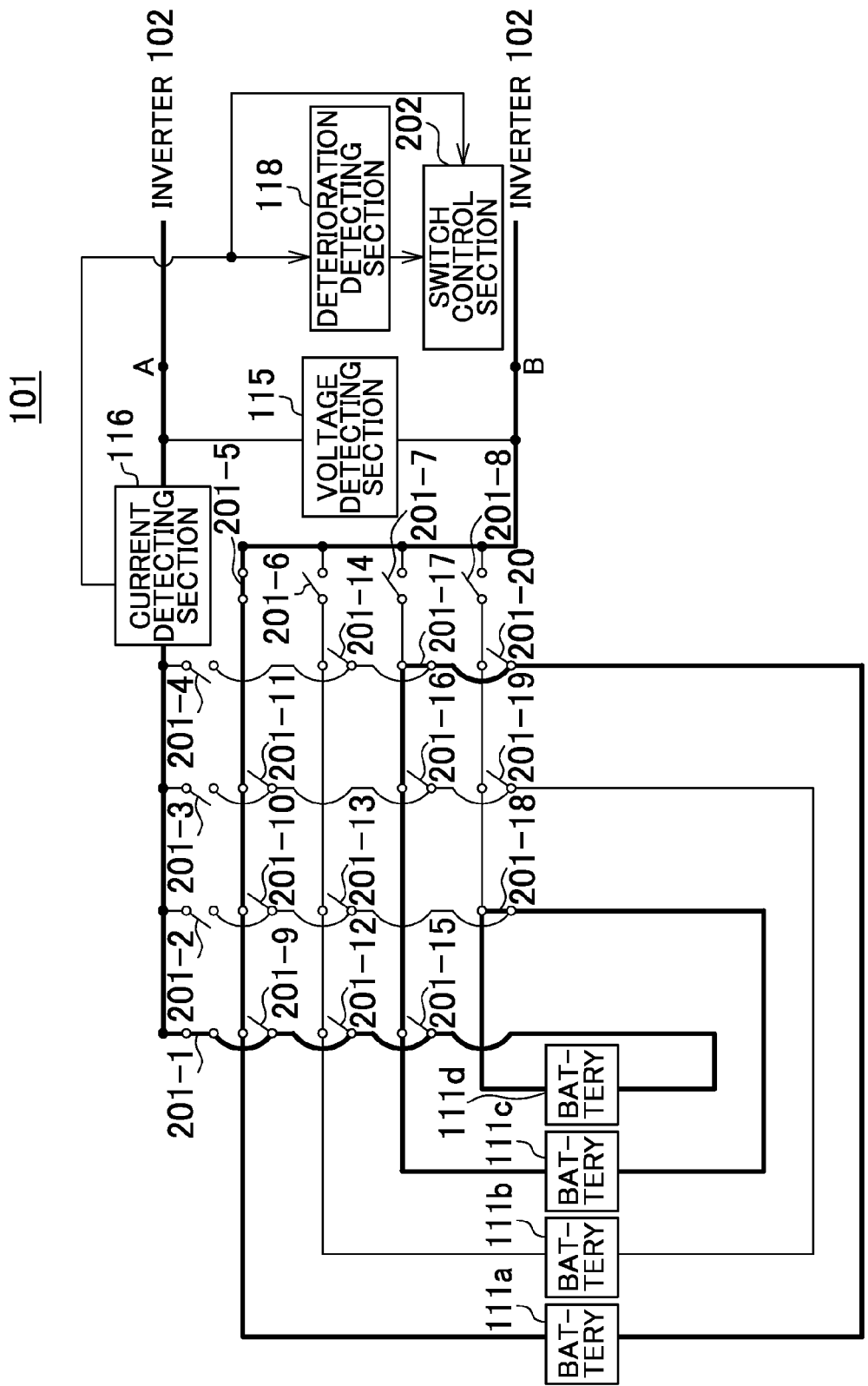
FIG. 9 shows an exemplary state of the battery circuit when the maximum voltage of the battery circuit drops below the second threshold value.

FIG. 9 shows an exemplary state of the battery circuit when the maximum voltage of the battery circuit drops below the second threshold value. Here, the battery 111b has a larger degree of deterioration than the other batteries 111. In this case, the switch control section 202 turns ON the first switches 201-1, 201-5, 201-17, and 201-18, and turns OFF the other first switches 201. As a result, the batteries 111a, 111c, and 111d can be connected serially and the battery 111b can be excluded from the battery circuit. By excluding the battery 111b having a larger degree of deterioration, the deterioration rates of the batteries 111 and the overall battery circuit can be decreased and the efficiency of the batteries 111 and the battery circuit can be improved. The thick lines in FIG. 9 represent the flow of the current supplied to the inverter 102.

In this way, when the maximum voltage of the battery circuit is less than or equal to the first threshold value, the battery control apparatus 101 can increase the maximum voltage of the battery circuit by connecting the batteries 111 in series. In other words, even if the battery indicator shows only a small amount of power remaining in the batteries 111, this remaining power amount can be instantaneously increased by serially connecting the batteries 111. For example, even when the voltage of the battery circuit is too low to drive the vehicle 100, since the batteries 111 are connected in series when the voltage is less than or equal to the first threshold value, the voltage of the batteries 111 can be increased and the vehicle 100 can run to the nearest charging station or to home. By changing the connection state of the batteries 111, the battery circuit itself can function as a backup battery. Furthermore, the vehicle 100 may include a notifying section that notifies a user when the voltage drops below the first threshold value and the second threshold value. The notifying section may display a notification, or may use sound to notify the user. In this way, the user can be made aware that only a small amount of power remains. The battery control apparatus 101 may be realized using an information processing device such as a CPU.

When the batteries 111 are connected in parallel and the voltage of the batteries 111 is less than or equal to the first threshold value, the switch control section 117 or the switch control section 202 may control the first switches 112 or the first switches 201 to connect at least a portion of the batteries 111 in series. Furthermore, when the voltage of the batteries 111 drops below the first threshold value, the switch control section 117 or the switch control section 202 may control the first switches 112 or the first switches 201 to connect a portion of the batteries 111 in series and connect each battery set, which is formed by serially connected batteries 111, in parallel. When the voltage of the batteries 111 drops below the second threshold value, the switch control section 117 or the switch control section 202 may control the first switches 112 or the first switches 201 to connect the batteries 111 in series. The voltage of the batteries 111 may be the voltage of any one of the batteries 111, or may be the average value of the voltages of two or more of the batteries 111. As another example, the voltage of the batteries 111 may be the average value of the voltage of all of the batteries 111.

The switch control section 117 or the switch control section 202 may control the first switches 112 or the first switches 201 to increase the number of serially connected batteries 111, according to the voltage value of the batteries 111. When the voltage value of the batteries 111 is lower, the number of serially connected batteries 111 may be higher. Each group of serially connected batteries 111 is a battery set. When there are a plurality of battery sets, the switch control section 117 or the switch control section 202 controls the first switches 112 or the first switches 201 to connect the battery sets in parallel.

When the maximum voltage of the battery circuit occurring when the batteries 111 are connected in parallel drops below the first threshold value, the switch control section 117 or the switch control section 202 may control the first switches 112 or the first switches 201 to connect a portion of the batteries 111 in series and connect the resulting battery sets, which are each formed by a plurality of serially connected batteries 111, in parallel. As a result, the voltage of the battery circuit is increased. After this, when the maximum voltage of the battery circuit again drops below the first threshold, the switch control section 117 or the switch control section 202 may control the first switches 112 or the first switches 201 to serially connect the batteries 111.

When the maximum voltage of the battery circuit drops below the first threshold value and instructions for switching the connections of the batteries 111 from the user, the switch control section 117 or the switch control section 202 may control the first switches 112 or the first switches 201 to connect a portion of the batteries 111 in series and connect the resulting battery sets, which are each formed by a plurality of serially connected batteries 111, in parallel. When the maximum voltage of the battery circuit drops below the second threshold value and instructions for switching the connections of the batteries 111 are received from the user, the switch control section 117 or the switch control section 202 may control the first switches 112 or the first switches 201 to connect the batteries 111 in series. For example, when the voltage of the battery circuit is too low to drive the vehicle 100, the batteries 111 are connected in series in response to the user inputting instructions for switching the connection state.

The batteries 111 may be battery cells, and a plurality of batteries may be connected to form a battery module. The battery module may include a plurality of batteries connected in series, or may include a plurality of batteries connected in parallel. The battery module may include battery cells connected in series and battery cells connected in parallel.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A battery control apparatus comprising:
a battery circuit in which a plurality of batteries are connected to each other;
a plurality of first switches that switch whether the batteries are connected in series or connected in parallel;
a voltage detecting section that detects a maximum voltage output by the battery circuit;
a deterioration detecting section that detects deterioration of each battery; and
a switch control section that, when the maximum voltage of the battery circuit occurring when the batteries are connected in parallel drops below a first threshold value, controls the first switches to connect batteries having similar deterioration in series and to connect each resulting battery set, which is formed by a plurality of batteries connected in series, in parallel.

2. The battery control apparatus according to claim 1, wherein
when the maximum voltage of the battery circuit drops below a second threshold value that is less than the first threshold value, the switch control section controls the first switches to connect the batteries in series.

3. The battery control apparatus according to claim 1, further comprising:
a plurality of bypass circuits that each exclude a corresponding battery from the battery circuit; and a plurality of second switches that are each connected to a corresponding bypass circuit and switch whether the corresponding battery is excluded from the battery circuit, wherein the switch control section controls the second switches to exclude from the battery circuit batteries having greater degrees of deterioration.

4. The battery control apparatus according to claim 1, wherein at least a portion of the first switches function to exclude batteries from the battery circuit, and the switch control section controls the first switches to exclude from the battery circuit batteries having greater degrees of deterioration.

5. The battery control apparatus according to claim 1, wherein the switch control section controls the first switches to increase the number of serially connected batteries according to the maximum voltage of the battery circuit, and, when the maximum voltage of the battery circuit is lower, the number of serially connected batteries is higher.

6. A vehicle comprising a battery control apparatus that includes:

a battery circuit in which a plurality of batteries are connected to each other;

a plurality of first switches that switch whether the batteries are connected in series or connected in parallel;

a voltage detecting section that detects a maximum voltage output by the battery circuit;

a deterioration detecting section that detects deterioration of each battery; and a switch control section that, when the maximum voltage of the battery circuit occurring when the batteries are connected in parallel drops below a first threshold value, controls the first switches to connect batteries having similar deterioration in series and to connect each resulting battery set, which is formed by a plurality of batteries connected in series, in parallel.

7. The vehicle according to claim 6, wherein the switch control section controls the first switches to increase the number of serially connected batteries according to the maximum voltage of the battery circuit, and, when the maximum voltage of the battery circuit is lower, the number of serially connected batteries is higher.

8. A battery control method comprising:

detecting a maximum voltage of a battery circuit in which a plurality of batteries are connected to each other;

detecting deterioration of each battery; and when the maximum voltage of the battery circuit occurring when the batteries are connected in parallel drops below a threshold value, controlling a plurality of switches, which switch whether the batteries are connected in series or connected in parallel, to connect batteries having similar deterioration in series and to connect each resulting battery set, which is formed by a plurality of batteries connected in series, in parallel.

9. The battery control method according to claim 8, further comprising controlling the plurality of switches to increase the number of serially connected batteries according to the maximum voltage of the battery circuit, wherein, when the maximum voltage of the battery circuit is lower, the number of serially connected batteries is higher.

* * * * *